(12) United States Patent
Saadat-Panah et al.

(10) Patent No.: US 10,042,886 B2
(45) Date of Patent: Aug. 7, 2018

(54) DISTRIBUTED RESOURCE-AWARE TASK SCHEDULING WITH REPLICATED DATA PLACEMENT IN PARALLEL DATABASE CLUSTERS

(71) Applicant: SAP SE, Walldorf (DE)

(72) Inventors: Pooya Saadat-Panah, Toronto (CA); Anisoara Nica, Waterloo (CA); Nathan Auch, Waterloo (CA); Peter Bumbulis, Cambridge (CA); Anil Kumar Goel, Waterloo (CA); Jeffrey Pound, Kitchener (CA)

(73) Assignee: SAP SE, Walldorf (DE)

( * ) Notice: Subject to any disclaimer, the term of this patent is extended or adjusted under 35 U.S.C. 154(b) by 357 days.

(21) Appl. No.: 14/816,681

(22) Filed: Aug. 3, 2015

(65) Prior Publication Data

US 2017/0039239 A1    Feb. 9, 2017

(51) Int. Cl.
*G06F 7/00*      (2006.01)
*G06F 17/30*     (2006.01)
*H04L 29/08*     (2006.01)

(52) U.S. Cl.
CPC .. *G06F 17/30463* (2013.01); *G06F 17/30312* (2013.01); *G06F 17/30958* (2013.01); *H04L 67/1097* (2013.01)

(58) Field of Classification Search
CPC ......... G06F 17/30359; G06F 17/30477; G06F 17/30463; G06F 17/30958; G06F 17/30312; H04L 67/1097

USPC .................. 707/718, 719, 723, 623
See application file for complete search history.

(56) References Cited

U.S. PATENT DOCUMENTS

| | | | | |
|---|---|---|---|---|
| 2006/0080285 | A1* | 4/2006 | Chowdhuri | G06F 17/30445 |
| 2010/0250518 | A1* | 9/2010 | Bruno | G06F 17/30386 |
| | | | | 707/718 |
| 2013/0297901 | A1* | 11/2013 | Nakada | G06F 12/1416 |
| | | | | 711/163 |
| 2014/0229221 | A1* | 8/2014 | Shih | G06Q 10/06313 |
| | | | | 705/7.23 |
| 2015/0234884 | A1* | 8/2015 | Henriksen | G06F 17/30359 |
| | | | | 707/623 |

* cited by examiner

*Primary Examiner* — Md I Uddin
(74) *Attorney, Agent, or Firm* — Buckley, Maschoff & Talwalkar LLC

(57) ABSTRACT

A method and system, the system including a plurality of machines each having a processor and a main memory component; a shared distributed storage facility storing a set of data and accessible by the plurality of machines over a communication network; a controller to select, in response to a state of a query execution plan comprising a plurality of executable jobs for the set of data, which one of a set of scheduling algorithms to execute; an execution engine to execute the selected scheduling algorithm to determine, for each job in the plurality of jobs, which server to schedule to execute the respective job; and providing an indication of the scheduling of the servers determined to be schedules for the execution of the jobs.

14 Claims, 3 Drawing Sheets

```
Type            string
ID              string
SenderHost      string
SenderPort      string
ReceiverHost    string
ReceiverPort    string
Command         string
Args            []string
IntegerResults  []int
BooleanResults  []bool
StringResults   []string
Err             string
```

*FIG. 3*

```
ID              string
Host            string
Port            string
IsCommand       bool
Executable      string
ExecutableSize  int64
Args            []string
Inputs          []string
InputsSizes     []int64
Outputs         []string
OutputsSizes    []int64
CPUCores        int
Memory          int
WaitFor         []string
SignalTo        []string
```

*FIG. 4*

DISTRIBUTED RESOURCE-AWARE TASK SCHEDULING WITH REPLICATED DATA PLACEMENT IN PARALLEL DATABASE CLUSTERS

BACKGROUND

Multiple servers may be configured into a system comprising a grouping or "cluster" servers. The cluster of computers may each include a processor and a local main memory. The clusters of computers may be interconnected via a communication network. The cluster of servers may further interface with a distributed data storage facility that stores a set of data that may be accessed by the servers comprising the cluster. The cluster of servers may cooperatively operate to process and execute queries of large datasets (e.g., Peta-bytes of data) such as, for example, databases related to popular social networks. The resources of the machines, including the main memory of the machines in the cluster, may be operated in parallel, in a manner that advantageously harnesses the power of the multiple machines in the cluster.

A concern regarding a cluster of machines operating in parallel and sharing memory is when and where to store the data that will be used in executing tasks by the cluster. A number of variables need to be accounted for in determining when and where to store the data used by the cluster of machines.

In some contexts, such as a cluster of servers, there may exist a desire to determine a schedule of how to execute a query execution plan, including when and where to store and replicate data associated with the query execution plan in an accurate and efficient manner.

BRIEF DESCRIPTION OF THE DRAWINGS

FIG. 3 is a tabular listing of a message formatting, according to some embodiments;

FIG. 4 is a tabular listing of the parameters of the structure of a job, according to some embodiments.

DETAILED DESCRIPTION

Figure 1:
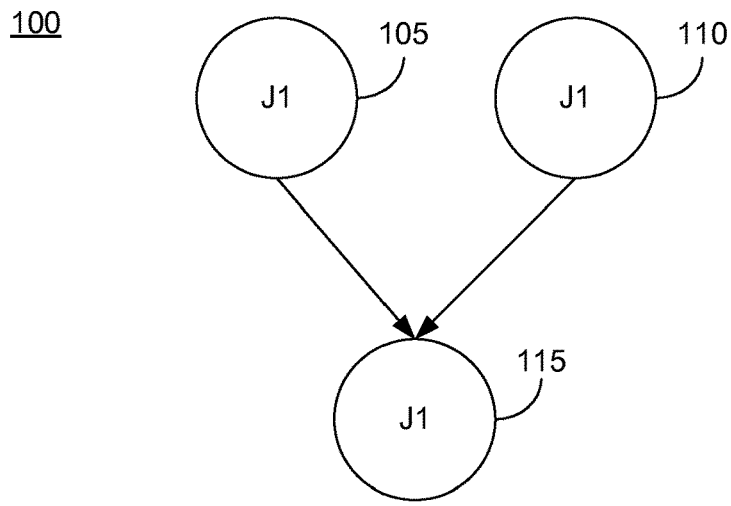
FIG. 1 is a depiction of a DAG, according to some embodiments.

The following description is provided to enable any person in the art to make and use the described embodiments. Various modifications, however, will remain readily apparent to those in the art.

In some aspects herein, systems and methods are disclosed for scheduling distributed queries or jobs in a large cluster or set of machines or servers where data may be hosted across the plurality of machines. In some embodiments, a dataset of data may be permanently stored on a shared storage facility and a "hot" portion of the data is kept on the memory layer of the cluster of machines. The data may be transferred between the shared storage facility and the memory layer as needed.

For sake of simplifying a discussion of various aspects of the present disclosure, a number of assumptions may be made. In some instances some of the assumptions may seem, in some regards, too restricting. Some of the assumptions may be later relaxed in further discussions and/or an implementation phase. However, for sake of simplicity of the present discussion of various modeling and scheduling processes, the assumptions will, at least for now, be imposed.

In some embodiments, the systems and methods herein may be disclosed assuming the following:
1. A system herein includes a cluster of machines for query execution.
2. All machines in the cluster can directly communicate with each other.
3. There are, generally, two types of machines, managers and workers. Workers are responsible for execution aspects and managers are responsible for administration tasks.
4. The communication bandwidth between every pairs of machines known. In other words, it is assumed that communication between all of the machines in a cluster is uniformly consistent and stable. It is noted that relaxing this constraint may only require adding more information to all the cost functions and additional bookkeeping.
5. The memory layer of each machine is limited, hence the memory layer of the whole cluster is limited. As such, all the datasets of an operating environment or context may (likely) not fit in the memory layer. Accordingly, it may be further assumed that there is a shared distributed storage that can store the datasets and the datasets can be loaded into memory whenever it is required from the shared storage facility.
6. Datasets or tables are partitioned and workers can load each partition separately.
7. Besides the shared storage, worker nodes can request other worker nodes for partitions of the data and can load them into their memory.
8. The queries considered herein for execution will be executed as a set of jobs. Each query may be translated to smaller jobs. The translation aspect may depend on a partitioning scheme of the tables and the semantics of the query.
9. Jobs are characteristically either an executable file that needs to be loaded into memory of the worker nodes or could be system installed commands. Each job requires a list of input files to be loaded to the worker node before execution and could produce a list of output file(s). The output files will also locate on the same node initially. Subsequently, other worker nodes may request transfer of the files depending, in some instances, on the rest of query plan.
10. A worker node that hosts a job should have enough free space in its memory layer for all input and output files.
11. If a worker node runs out of memory space, it can start to evict unnecessary files. If files to be removed are locked (i.e., they are currently used by some jobs), the worker node cannot remove them on its own.
12. Files could be locked to a worker node in order to keep the files in a particular place for future use. Locking (unlocking) of files may be handled by manager nodes.

In some aspects, the problem of distributed query optimization is very complex. In some instances, job scheduling may be a form of post-optimization that tries to minimize a run time of a query execution plan. In general, the scheduling should take into account the locality of data, the cost of data transfers, the cost of executing each job in a worker node, and the load on each worker node.

In some embodiments, aspects of single main memory machine are extended to many machines having a processor and a main memory grouped together (at least logically) in a cluster. Embodiments of the present disclosure may relate to clusters of main memory machines having a simple main memory distributed system.

In some regards, essential aspects for some embodiments herein include:

1. An ability to store partitions of data in the cluster environment and make it available to all interested worker nodes.
2. An ability to run an executable on any worker node and provide all necessary information such as flags and environment variables for execution.

Based in these requirements, systems and methods herein may start distributed storage data nodes on the main memory instead of the disk. Since the systems and method herein use main memory, the locality of the data for a query execution plan is important and computation(s) may be pushed to the worker nodes that contain the data partitions that will be used in the computations. In some instance, even if a worker node does not have a partition, it may be preferred to load the data from the memory of other worker nodes.

In some embodiments, systems and methods herein may include functionality of explicit data placement.

Current distributed systems may either use the disk or memory as the main storage of the data partitions. In at least some systems herein, both a disk storage facility and a memory can be used as the main storage of the data partitions at the same time, wherein a traditional memory hierarchy in single machine systems can be extended for distributed systems. In some aspects, the systems herein not only use the distributed storage technologies (e.g., HDFS) to access disk space of all the machines but also defines a distributed memory layer on top of the distributed storage. In some regards, this behavior may hide the distributed nature of the cluster and makes the programming easier by introducing intra memory communication. In some embodiments, the distributed memory layer consists of many memory pieces of different single machines. All these memories are connected to each other through a network layer and can transmit/receive data directly to/from each other. In some instances, intra memory communication may be faster than the disk to memory transfer and it may be preferable to move the data among the pieces of the memory instead of the disk. In some embodiments, a system in accordance with the present disclosure may be able to move data partitions to the memory on-demand and evict the data partitions (and/or other data structures) when the memory runs low or out of space. Similar to a single machine architecture, anything that loads into memory may need to be moved back to disk for data consistency.

In some embodiments, the data may be read-only and only write back the result of a computation to the disk storage, including providing explicit data placement. The explicit data placement feature herein may be selectively turned off and on. In some embodiments, a system including a plurality of servers and/or other machines may also support data replicas and parallel access to the data. In part, the main memory layer may be capable of storing multiple copies of the data in different machines. Such supported behavior may enable the processors of the various machines to have access to a local copy of the data instead of reading it from a remote location. In some other aspects, each partition in the system may have a unique name or other identifier. The name (identifier) may be generated based on, for example, the computation that created the partition or some other protocol. The unique name or identifier may operate to provide a mechanism to keep account of the lineage of a computation and avoid the re-computation of the available partitions.

In some embodiments herein, a system and the processes implemented thereby support the execution of DAGs (directed acyclic graphs) of jobs. For any computation (e.g., a sequence of jobs to execute a query) that is translatable to a DAG, it is possible that the DAG be executed using the system(s) disclosed herein. This principle includes map-reduce, SQL, and other representations of sets of jobs.

In some embodiments and contexts, a system in accordance with various aspects of the present disclosure may be designed with fast OLAP execution as a consideration. Moreover, systems and frameworks herein may be extended to process complex DAG models, such as for example, conditional DAGs and boolean operators (and/or/xor/ . . . ).

In some aspects, systems herein provide highly adaptive dynamic task scheduling and data placement with multiple objective functions. In contrast to some previous systems, the presently disclosed systems provide a mechanism to control locality of the data. The system is thus enabled to dynamically adapt to the nature of the workload and determine the best data/job placement policy. In some embodiments, this feature offers improved flexibility for using the data locality and to run/schedule the jobs on the most cost effective machines. Different factors may trigger the system to adapt to the changes including, for example, a state of the cluster and workload characteristics.

To further add adaptability to the system(s) herein, multiple different scheduling and rescheduling algorithms may be developed and implemented. Such algorithms may be designed for variety of cluster state/workload characteristics. Additionally, a framework or system herein is able to optimize many different objective functions based on the requirements of a workload. Some objective functions may include minimizing the load on machines, faster single query execution, minimizing network communication, and minimizing power consumption. In some embodiments, heterogeneous machines may be added to a cluster since the system may adapt to changes.

In some embodiments, a system herein may have one or more of the following characteristics:
Explicit data placement
Distributed cache layer
Intra-memory communication
Ability to move data from disk to memory and keep it, at least temporarily, for faster access
Replicas of data in main-memory layer for faster computation
Read only system+writing the intermediate results to disk
Lineage based computation and uniqueness of the resource names for future use.
DAG of jobs execution model
Ability to extend the DAG for more sophisticated models such as wait for one of the jobs and then run.
Support other computation models such as map-reduce and SQL
Locality benefits of computations based on job placement policies
Multiple options for cost objective functions including: (1) minimize the load on machines, (2) Faster single query execution, (3) minimizing network communication cost, and (4) minimize power consumption.
Consider a current state of the cluster; workload characteristics (cheap/expensive to execute; complex/simple DAGs).
Provide a solution that uses at least one of multiple different types of scheduling algorithms; choose among them based on workload/current states; reschedule jobs based on current properties (e.g., estimated runtime).

choose subsets of unscheduled jobs for input to a scheduling algorithm.

very different cluster settings: servers with different resources (e.g., CPU, memory, communication bandwidth); 10^N (e.g., 10000) servers According to some aspects herein, each query execution plan can be represented as a DAG of jobs, where the edges between the jobs in the DAG shows the dependency of the jobs and DAGs can capture two types of dependencies, time and resource dependencies. Time dependency herein means that a job has to wait for another job to start its execution. The time dependency may happen for number of reasons but one reason may occur when there is a limited degree of parallelism and jobs have to execute sequentially. The edges of the DAGs can impose a time dependent order.

Regarding a resource dependency, the output of one job may be an input to another job. In general, if a job is dependent on multiple jobs, then it has to wait for all of them to finish executing first and after that it can start the execution.

Figure 2:
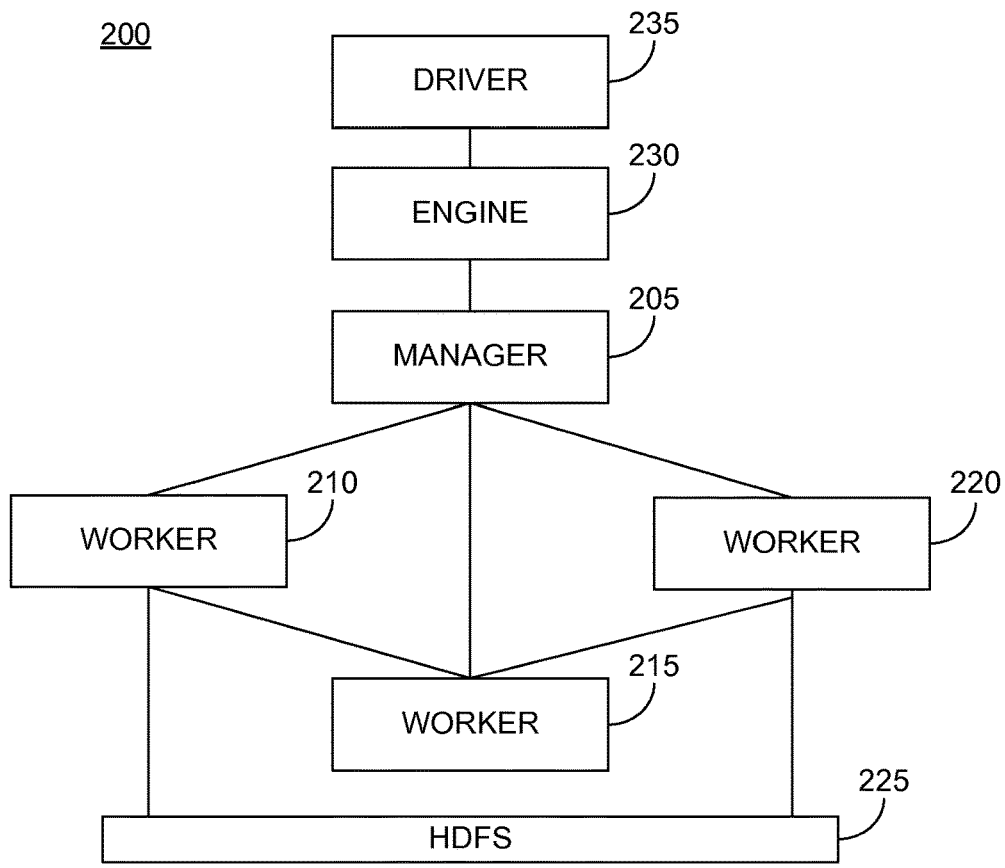
FIG. 2 is a schematic diagram of a logical architecture for some aspects of a system, according to some embodiments herein.

FIG. 1 is an illustration of a DAG. FIG. 1 shows a DAG 100 of jobs for executing a join between two tables T1 and T2, where it is assumed that T1 has two partitions and T2 has one. DAG 100 includes a plurality of jobs 105, 110, and 115. The directional arrows between the jobs indicate the dependencies $J1: R1 = T_1 \cdot P1 \bowtie T2 \cdot P1$ $J2: R2 = T1 \cdot P2 \bowtie T2 \cdot P1$ $J3: R = R1 \cup R_2$ FIG. 2 is a high level logical depiction of a system, according to some embodiments and aspects herein. In some embodiments, a master/slave design scheme is used for the distributed systems herein. There may be one master node and many worker nodes. FIG. 2 includes the main components of the architecture of a system 200. The edges between the components show the communication links. In this architecture, manager 205 (i.e., the master) is responsible for keeping track of the workers and providing a centralized component for aggregating the statistics about the cluster and routing the requests to the workers. Workers 210, 215, and 220 are responsible for executing jobs and keeping the data in the main memory of the machine on which they are running.

In some instances, the workers have to register with master 205 and send liveliness messages to enable the tracking. The workers connected to each other can request partitions of the data from each other. As also illustrated in FIG. 2, all workers 210, 215, and 220 are connected to a HDFS storage 225 (or other type) and can read from and write to it. All partitions of the tables are preloaded into the HDFS 225 and could be accessed by each of the workers. Engine 230 is responsible for executing the DAG of jobs and keeping track of the execution. Engine 230 talks directly to the master (i.e., manager 205) and sends the request(s) to the slaves (workers 210, 215, and 220). Driver 235 is the component that submits DAGs to engine 230 and requests the results from engine 230.

In some embodiments herein, communications between all components are IP/TCP based and each component is attached to one port and listens to the port for upcoming messages. Components know how to encode/decode communication message. FIG. 3 shows the fields in a message, in some embodiments. The length of the fields may be fixed and/or variable length.

In some embodiments, each message has a type so the components are able to distinguish between messages and respond to them appropriately. The ID field is used to identify a series of messages. As an example, if a component tries to respond to a message, it will send the message to the source using the same ID. In this manner, a technique can be used by a receiver of the message that helps the receiver to keep track of request-response pairs. If a component wants to generate a new chain of request and responses, it will generate a new ID. The SenderHost, SenderPort, ReceiverHost, ReceiverPort fields are defined to identify the source and target of a message and help the receiver thereof to prepare a response and send it to the source if need be. The Command field may be used to distinguish between messages of the same type. For example, if a Command is an actual executable we might use Args to pass additional arguments. IntegerResults, BooleanResults, StringResults may be used to return the result of a command to the requester. These results could be quite varied and their interpretation depends on the sender and receiver. The Err field is used to send the reason for a potential failure to the requester to help debug the system or for rescheduling and reoptimizing purposes.

As used herein, jobs are known as a unit of computation. Jobs will run an executable on a set of input file(s) and produces a set of output file(s). A job has a list of jobs that it has to wait to finish before starting and a list of jobs that it has to inform about its completion. These two lists help to generate the DAG of jobs and maintain the order amongst the jobs.

FIG. 4 is an illustrative example of data structure of a job object. As such, each job has a unique ID so it can be tracked (e.g., collect statistics about a particular job) and track it through the system. The Host and Port fields show the intended worker where the job is to be executed. IsCommand is a boolean variable that tells the system whether the Executable is a system command already installed on the worker or whether it is a file to be loaded into the worker before execution. Args defines the arguments that must be sent to the executable. Inputs is a list if files that must be loaded into the worker node to being processed by the Executable. Outputs is a list of files that will be generated after the execution. ExecutableSize, InputsSizes, OutputsSizes define an upper bound estimate for the size of all the files that need to be located on the worker node. The reason to define them is to make sure that it is possible to allocate enough free space to execute the jobs. CPUCores, Memory are being set to make sure each job has access to enough computation resources. The WaitFor, SignalTo fields define the order in the DAG of jobs.

Regarding the distributed query processing scheduling problem, finding an optimal solution is NP-Hard.

Each distributed query may be described or represented as a DAG of jobs. The order in the DAG shows the sequence and pre-requisites for each job and it explicitly includes the information about the timing constraint of the job in the form of the extra Edges (e.g. two jobs that are siblings. Each job reads its input files, executes, and writes its output files. Based on the operation, jobs can have no inputs or outputs. Jobs are the most general form of computation and can include anything as an executable.

Assigning a job to a worker node for execution may require consideration of the status of a worker node (e.g., it is already running a job or has queued some jobs for execution plus the status of the files on the memory of the worker nodes). Jobs might likely benefit from the co-location of the data and execution. In other words it is costly to move the data around the cluster. Also, note that the efficient use of resources may be another goal that the scheduling problem should take into account. To clarify, locality and resource utilization are sometimes competing and defining a cost model that considers all factors requires effort.

In one instance, when a query arrives an optimizer will translate the query into a DAG of jobs. The optimizer may use the information about the partitions of tables to generate a correct plan for execution. A next step is to assign the jobs to the worker nodes. This problem has two inputs; (1) the DAG of jobs and (2) the current status of the cluster. Using these two pieces of information, the solution should generate an assignment of the jobs to worker nodes.

In some embodiments, we can formally define the input of the problem as follows:
1. A DAG D of jobs J that shows the correct plan for executing a Query Q. This DAG only considers the partitions of the tables and, regardless of data placement, execution of this DAG will generate the answer for the Query. The vertices of the DAG indicate the jobs and edges indicate the order of execution. A job can be executed only and if only its parents has been previously executed.
2. Assume each job j has a property vector as shown in Table 1. The Id field uniquely specifies a job and unique jobs may be identified using the notation $j_i$. The property rt determines an upper bound for the time that job requires to finish in the case that all required input files are available to the job. The rtcl property indicates a confidence level of this estimate, a number in (0, 1]. rt does not include the time that is required to fetch the files from remote storages. The property [IN] defines the list of files that are an input to the job j. Each object in this list is a property vector itself. The property vector of each file indicates its unique id, the estimated size (i. e., an upper bound) of the file s and the confidence level scl for the estimate. The property [OUT] defines the list of output files which include property vectors. The st property indicates the status of the job. It can be either finished, running, scheduled, or unscheduled (i.e., waiting).

TABLE 1

Job property vector

| Property | Description |
| --- | --- |
| id | unique id |
| (rt, rtcl) | (estimated running time, running time confidence level) |
| | list of input files |
| [IN < id, s, scl >] | (unique id, estimated size, size confidence level) |
| | list of output files |
| [OUT < id, s, scl >] | (unique id, estimated size, size confidence level) |
| st | status of the job |

Another input is the state of the cluster worker nodes. Each worker node has a property vector that is depicted in Table 2. The property id uniquely specifies a worker node and can be used to refer to a unique worker using the notation ni. Since these workers are logical workers, it is recommended to use a combination of the host and port to identify each logical worker. The at property determines the earliest time that we can schedule a job on the node. In some instances, some nodes might still be running jobs on the scheduling phase so there is a need to know when they will become available. The property at indicates an absolute value or the clock on the wall. The at is an estimate. It may be the case that some workers that are supposed to be free but are still running a job and are behind the schedule (under estimation). The property st is a boolean that indicates the status of the worker (e.g. free/busy) at the current time. The property fs determines the free memory space on the worker node at time at and pfs determines the potential free space on the worker node at time at. The potential means how much space is available if all the unlocked files are evicted from the worker node. [FILES] is a list that indicates the property vector of files that are located on the worker node at time at. The vectors are similar to the ones in [IN] list. An additional property has been added that determines the lock status of the files (e.g. locked/unlocked/soft locked).

TABLE 2

Worker node's property vector

| Property | Description |
| --- | --- |
| id | unique id |
| at | availability time |
| st | status of the worker |
| fs | free space |
| pfs | potential free space |
| [FILES < id, s, scl, l >] | list of files (unique id, size, size confidence level, lock status) |

In some embodiments, the solution to the problem has a form of:
1. A function f that maps each jobs to a worker node $f(j_i)=n_k$. This function will inform the cluster where to run each job.
2. For each worker node there exist a queue that determines the order that the worker node should execute the jobs that are assigned to the worker node $ji_1 > ji_2 > \ldots > ji_k$. Since the function only provides the mapping, queues are needed to explicitly specify the order of execution. Besides these queues, execution plan should may also include the parent-child relations from the input DAG as well. Thus, although worker nodes have a scheduled queue, they might still experience some idle times due to these constraints from the DAG.

In some embodiments, a number of assumptions may be made in defining a solution. The assumptions include:
1. If a job is executed on a worker node, its input and output files must be located on the same node. The inputs can be fetched from remote storage, but it may not be possible to stream input and output files to a remote storage. This implies that the worker node should have enough free space for all input and output files.
2. The rt of a job is always greater than zero.
3. Each worker can execute one job at a time. That is, the job has exclusive access to the resources of the worker node. Note that intra job parallelism is allowed. In some aspects, the scheduling problem does not consider the resource constraints of the jobs other than required memory space.

In accordance with some embodiments herein, a number of scheduling algorithms will now be disclosed. The scheduling algorithms herein may be used by a system, service, or apparatus to determine a schedule for executing a plurality of jobs comprising a query execution plan. In some aspects, the scheduling algorithms may be designed to determine an optimal objective. For example, an objective of a scheduling algorithm herein may be to schedule jobs on a set (e.g., cluster) of servers to minimize certain parameter, such as, for example, minimizing the finish time of the lastest job (i.e. makespan).

As generally used herein, input to a scheduling algorithm may include a set of base data tables, D. Each such data set D has an actual size. Additional input may include a set of servers S such that each server S∈S has a current state. The state of each server may be characterized by having:

1. a total storage capacity;
2. data in D∪I already stored on S; and
3. a set of jobs already scheduled or running on S.

Additional input to a scheduling algorithm herein may include a set of intermediate results, I, produced by execution of the jobs. In some aspects, each intermediate result has an estimated or otherwise determinable size.

In some aspects, a query execution plan may be represented as a set of jobs, J. The set of jobs J may have the following characteristics. Namely, each job has an estimated runtime; each job has a state, either running, scheduled on a server S, or unscheduled; each job has a set of input data from D∪I; and each job has a set of output data from I.

In some aspects, the execution of some scheduling algorithms herein may be subject to some constraints. For example, each job may produce, in some instances, at most, one intermediate result, but jobs can consume one or more (i.e., any) number of intermediate results and base data tables as inputs. In some aspects, each job may be computed on exactly one server. In some embodiments, all inputs to a job may, as a prerequisite, be moved to the particular server that will compute/execute the job in order to start executing the job. In the instance a job produces an intermediate result as an output, then that output is also stored on the server. In some aspects, data that is no longer needed on any given server can be erased to free up more space on that server. In some regards, each server storage capacity cannot be surpassed at any given time.

In some regards, a purpose of the scheduling algorithms disclosed herein is to determine which server in a cluster of servers will execute the individual jobs in a set of jobs representing a query execution plan. As such, an output of the scheduling algorithms herein may include a mapping m: J→S (i.e., the set of jobs, J, is mapped onto the set of servers S), indicating on which server each of the jobs should be placed to minimize the objective functions of the scheduling algorithm. In some embodiments, some scheduling algorithms in accordance with the present disclosure may enforce a specific total ordering on the jobs placed on a particular server.

In some embodiments, a goal of a scheduling algorithm herein may be to place unscheduled jobs on different servers in order to minimize a total data communication cost (i.e., the costs associated with moving data between servers) in executing a query execution plan. As referred to herein, the maximum total runtime of all jobs on one server can also be minimized using such an algorithm. In some embodiments, inter-job dependencies between jobs comprising a set of jobs representing the query execution plan may be ignored. Furthermore, it can be assumed that no jobs have already been scheduled. Given these assumptions, a linear programming algorithm will now be presented.

In some embodiments, there may be a number of constants applicable to this (first) scheduling algorithm. The constants may include:

1. $V = D \cup J$, where V is refers to a set of "vertices."
2. For view $V_i \in V$: If $V_i$ is a base table, let $t_i$ be its size. If $V_i$ is a job, let $t_i$ be the size of its output, if $V_i$ has output. If the job produces no intermediate result, $t_i = 0$.
3. For $V_i \in J$, let $l_i$ be the runtime of $V_i$.
4. For $S_k \in S$, let $s_k$ be the storage capacity of this server.
5. For $V_i \in D$, and $S_k \in S$: let $c_{i,k}$ be a constant that is 1 if and only if $V_i$ is initially stored on the server $S_k$.
6. A directed acyclic graph $K = (V, E)$, where $(V_i, V_j) \in E$ if and only if job $V_j$ uses the data from 16 as input.

In addition to the constants introduced above for the first scheduling algorithm herein, a number of variables are also relevant to the current integer programming problem, including:

1. $|J| \times |S|$ variables are defined as follows:
   For $V_i \in J$, $S_k \in S$, let $x_{i,k} \in \{0, 1\}$ be a boolean variable. For a solution defining $x_{i,k}$, the interpretation is that $x_{i,k} = 1$ if and only if job $V_i$ is placed on the server $S_k$.
2. $|V| \times |S|$ variables are defined as follows:
   For $V_i \in V$, $S_k \in S$, let $m_{i,k} \in \{0, 1\}$ be a boolean variable. The interpretation is that $m_{i,k} = 1$ if and only if the data in $V_i$ is consumed by some (at least one) job on server $S_k$.
3. $|V| \times |S|$ variables are defined as follows:
   For $V_i \in V$, $S_k \in S$, let $n_{i,k} \in \{0, 1\}$ be a boolean variable. The interpretation is that $n_{i,k} = 1$ if and only if the data in $V_i$ is consumed by some job on server $S_k$ and $V_i$ is not placed on server $S_k$. Thus:
   If $V_i \in J$: $S_{i,k} = 1$ if $m_{i,k} = 1$ and $x_{i,k} = 0$
   If $V_i \in D$: $n_{i,k} = 1$ if $m_{i,k} = 1$ and $c_{i,k} = 0$
4. One variable is defined as follows:
   Let r be a variable representing the maximum of all servers' total runtimes.

For this particular (i.e., first) scheduling algorithm disclosed herein, there may be two possible objective functions for this integer programming problem, including:

1. min: r
2. min: $\Sigma_{S_k \in S}(\Sigma_{V_i \in V} n_{i,k} \cdot t_i)$

The first objective (1) is to minimize a total runtime and the second objective (2) is to minimize a total data communication cost. In some embodiments, a decision may be made to minimize some weighted average (or other factor) of these functions.

Regarding the present scheduling algorithm, there may be a number of constraints including, for example:

1. $|J|$ constraints defined as follows:
Any job must be placed on exactly one server. As such, $$\forall V_i \in J$$

$$\sum_{S_k \in S} x_{i,k} = 1$$

NEW/LAST CHANGES

2. $|S|$ constraints defined as follows:
This constraint, along with the first objective (1) above, ensures that r is the maximum of the total runtimes of each server:

$$\forall S_k \in S$$

$$r \geq \sum_{V_i \in J} x_{i,k} \cdot l_i$$

-continued $$r \geq x_{i,k} \cdot I_i V_i \in J$$

3. |S| constraints defined as follows:

The total size of all data on server $S_k$ cannot exceed $s_k$ at any time. In some instances, this constraint may be strengthened to ease computation, mandating that the sum of the sizes of all data ever stored on $S_k$, including input and intermediate results produced, does not exceed $s_k$ (NOTE: In some embodiments, $x_{i,k}$ and $n_{i,k}$ are never 1 in the same time):

$$\forall S_k \in S$$
$$\sum_{V_i \in V} (x_{i,k} + n_{i,k}) \cdot I_i \leq s_k$$

4. 2×|E|×|S| constraints defined as follows:

These constraints ensure that $m_{i,k}=1$ if and only if the data in $V_i$ is consumed by some job on server $S_k$.

$$\forall (V_j, V_i) \in E, S_k \in S$$
$$x_{j,k} \leq m_{i,k}$$
$$m_{i,k} \leq \sum_{V_j \in V: (V_j, V_i) \in E} x_{j,k}$$

5. 3×|V|×|S| constraints, defined as follows

For $V_j \in J$, these constraints ensure that $n_{i,k}=1$, if and only if the data in $m_{i,k}=1$ and $x_{i,k}=0$:

if $x_{i,k}=1 \rightarrow n_{i,k}=0$ from (1)
if $x_{i,k}=0$ and $m_{i,k}=0 \rightarrow n_{i,k}=0$ from (2)
if $x_{i,k}=0$ and $m_{i,k}=1 \rightarrow n_{i,k}=1$ from (3)

$\forall V_i \in V, S_k \in S$ (1) $n_{i,k} \leq 1-x_{i,k}$
(2) $n_{i,k} \leq m_{i,k}$
(3) $n_{i,k} \geq m_{i,k}-x_{i,k}$ For $V_j \in D$, merely substitute $c_{i,k}$ for $x_{i,k}$ in the above constraints.

Another scheduling algorithm (i.e., second algorithm) in some embodiments herein may consider the possibility that there are inter-job dependencies between jobs in a set of jobs related to a query execution plan. An objective goal in such a scheduling algorithm being introduced here (and in some other algorithms disclosed below), is to minimize a finish time of the last server. That is, an overall objective of the scheduling may be to minimize the makespan of the scheduling.

To facilitate this second scheduling algorithm, a DAG D representation of a set of jobs comprising a query execution plan may be constructed. The DAG will have tasks as vertices and edges representing the interdependencies between tasks. Each task is either a query execution job or a loading of a file onto a server in the cluster of servers. Each task may be placed on exactly one server, in accordance with constraints in some embodiments herein. However, data files need not be loaded onto a server that they are already on. In some embodiments, the edges in D representing dependencies may be defined according to the following rules:

1. A task is constrained to wait for the last previous task on the same server.
2. The task of loading an intermediate result onto a new server is obligated to wait for the job that produced the intermediate result.

Given that the longest path in a directed acyclic graph can be found in linear time, determining the time at which each server finishes or completes its jobs in D can be efficiently accomplished. In some instances herein, D may be initialized using already scheduled jobs. Then, new jobs may be ordered (arbitrarily) in a way that obeys their dependencies. Next, one at a time, the new jobs may be optimally placed on servers to minimize the maximum server finish time. Thereafter, D may be updated by adding the job, all necessary loading tasks, and all necessary edges.

Figure 5:
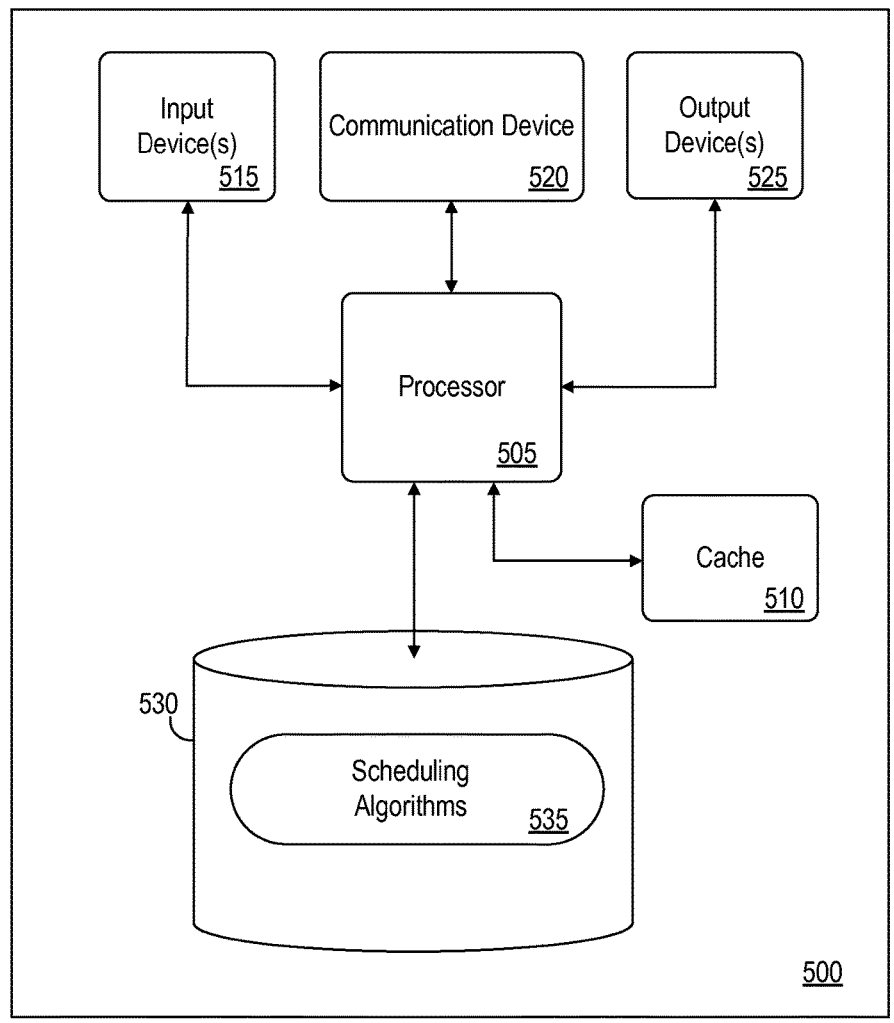
FIG. 5 is a schematic block diagram of a system, in accordance with some embodiments.

FIG. 5 is a flow diagram of a process 500 related to a scheduling as just described.

STEP 1: Initialize D with scheduled jobs.
STEP 2: Select the next new job J from the list of new jobs to schedule.
STEP 3: Iterate over all servers on which J can be placed and measure the times at which each server would finish if J were scheduled on each server.
STEP 4: Select the server S that minimizes the makespan. If two schedulings tie, minimize the second largest server finish time. If these tie, continue until the tie is broken.
STEP 5: Schedule J on S and add the appropriate vertices and edges to D.
STEP 6: If the list of new jobs to schedule is empty, terminate. Otherwise, go to step 2

A next (i.e., third) scheduling algorithm (i.e., a "critical path method" algorithm) herein is similar in some respects to the previously introduced and discussed "greedy" algorithm. In a departure from the foregoing "greedy" scheduling algorithm where new jobs are arbitrarily ordered and then scheduled one by one, the present scheduling algorithm repeatedly selects each (new) job with the earliest release date and latest critical time as the next job to be scheduled using the previous algorithm.

As referred to herein, the release date of a job is defined as the time at which all input files have been produced so that execution of the particular job can start. Furthermore, a job's critical time is defined herein as its runtime plus the total runtime of its longest chain of ancestors.

Accordingly, after initializing D using the already scheduled jobs, new jobs may be ordered by recursively selecting each new unscheduled job with the earliest release date and latest critical time, before proceeding to optimally schedule that job in a manner that also obeys the jobs' dependencies. The scheduling algorithm then continues by optimally placing the new jobs on the servers to minimize the maximum server finish time. D may then be updated by adding the job, all necessary loading tasks, and all necessary edges.

In some respects, the scheduling of a large number of jobs (e.g., 1000 jobs) using linear programming may require the consideration and use of a lot of variables. The number of variables being considered and the fact that jobs in a set of jobs may depend on one another can greatly increase the complexity of optimally scheduling the execution of a query plan over a cluster of machines sharing main memory.

In an effort to address the complexities that may be encountered in optimally scheduling jobs amongst a cluster of servers, for example, jobs may be scheduled on a "layer by layer" basis. As used herein, a set of jobs may be (logically) organized into layers comprising subsets of jobs, wherein jobs in a same subset or layer that do not depend on each other (i.e., no dependencies) and are grouped together in a layer. In this manner, a complex scheduling problem may be divided into more manageable sub-problems each having fewer jobs where the jobs in the subsets (i.e., layer) do not depend on each other.

A layer by layer integer programming algorithm herein (i.e., the "fourth" algorithm) may be defined, in part, by a number of constants. The constants in this linear programming problem may include:

$p_i$: the runtime of job 1;
$r_i$: the release date of job i (i.e. the time when the last input file is produced);
$l_i$: the time it takes to load data file i onto another server; and
$f_k$: the finish time of server k, before scheduling new jobs.

The variables in the present linear programming problem may include:

schedule$_{ik}$—a boolean variable representing job i being placed on server k;
load$_{ik}$—a boolean variable representing data i being loaded onto server k;
start$_k$—the time at which new jobs can start to be scheduled on server k; and
makespan—the maximum server finish time, wherein this is the objective function to be minimized by the current scheduling algorithm.

Constraints for this layer by layer scheduling algorithm include: If job j consumes file d and file d is not on server k, then following constraint is applicable:

load$_{dk}$≥schedule$_{jk}$

In accordance with the present scheduling algorithm, server k cannot start processing new jobs until all of its previous jobs are complete, and until all input files consumed by the server are produced. In some regards, this is an overly pessimistic assumption since not every new job on server k should have to wait for every single input file. Accordingly, start$_k$≥f$_k$
start$_k$≥schedule$_{ik}$*r$_i$ ∀i∈J Additionally, each job i must be placed on exactly one server, as represented by:

$$\sum_{k \in S} \text{schedule}_{ik} = 1$$

The makespan (i.e., the objective function to be minimized) is the minimum of the maximum server finish times, thus for each server k:

$$\text{start}_k + \sum_{J_i \in uJ} (p_i \times \text{schedule}_{i,k}) + \sum_{T_d \in D \cup I} (l_d \times \text{load}_{d,k}) \leq \text{makespan}$$

One embodiment of a scheduling herein includes a second variation of a layer by layer scheduling algorithm (e.g., the "fifth" scheduling algorithm herein). This variant of the layer by layer scheduling algorithm does not assume that each new job on a server must wait for all inputs to jobs on that server to be produced. Applicants hereof have realized that it would be beneficial to take advantage of the fact that each job has a unique release date.

As in the previously discussed layer by layer scheduling algorithm, new jobs will be scheduled one layer at a time. Additionally, the new jobs will be ordered in ascending order by their release dates. As such, an ordered list (j1, . . . jn) will be generated. For this scheduling protocol, let l be the number of servers, m be the number of files consumed by new jobs, and n be the number of new jobs to schedule.

Constants defined for this scheduling algorithm include:
1. For each job i, $r_i$ is the release date of the job, where $r_i$ is the latest production date of the input files of job i. (n constants)
2. For each job i, $p_i$ is the processing time of job i. (n constants)
3. For each data file d, $l_d$ is the time it takes to load file d onto a server. (m constants)
4. For each server k, $f_k$ is the time at which previously scheduled jobs finish on that server. (l constants)

Variables for this second variation of a layer by layer scheduling algorithm include:
1. For each job i and server k, schedule$_{ik}$ is a boolean variable and schedule$_{ik}$=1 if job i is scheduled on server k. (l*n variables)
2. For each job i and server k, start$_{ik}$ represents the time at which job i starts to run on server k; start$_{ik}$ is defined even if job i is not scheduled on server k. (l*n variables)
3. For each file d and job i that consumes file d, and for each server k, load$_{idk}$ is a boolean variable; load$_{idk}$=1 if file d must be loaded onto server k in order to run job i. (≤l m n variables)
4. For each job i and server k, runtime$_{ik}$ represents the amount of time job i spends running on server k; including loading times and processing times. If job i is not scheduled on server k (i.e. schedulei$_k$=0), then runtime$_{ik}$=0. (l*n variables)
5. makespan is the maximum of the servers' finish times, after new jobs are scheduled. (1 variable)

This fifth algorithm disclosed herein (i.e., second variant of a layer by layer scheduling algorithm) operates with the following constraints:
1. Each job must be scheduled on exactly one server (n constraints):

$$\sum_{i \in uJ} \text{schedule}_{ik} = 1$$

2. Job i cannot start on server k before its release date (l*n constraints):
start$_{ik}$≥r$_i$
3. Job i cannot start on server k until the scheduled jobs on server k are finished (l constraints):
start$_{1k}$≥f$_k$
4. For 1<=i<n (where n is the number of new jobs to schedule), Job i+1 cannot start on server k until job i has finished on that server. However, note that even if job i is not placed on server k, start$_{ik}$ is still meaningful to maintain the ordering of the jobs. (l*(n−1) constraints):
start$_{(i+1)k}$≥start$_{ik}$+runtime$_{ik}$
5. The runtime of job i on server k is 0 if job i is not scheduled on server k. Otherwise, the runtime is the sum of the processing time for job i and the times it takes to load necessary input files. (l n constraints):

$$\text{runtime}_{ik} = p_i \cdot \text{schedule}_{ik} + \sum_{d \in D, \text{consumed by job } i} l_d \cdot \text{load}_{idk}$$

6. File d must be loaded onto server k for job i if job i is scheduled on server k and no previous job j has loaded file d onto server k (≤l m n constraints):

$$load_{idk} \geq schedule_{ik} - \sum_{j=1}^{i-1} load_{jdk}$$

7. Makespan is the maximum of the server finish times. Since the jobs are explicitly ordered in the present example, server k finishes with the finish time of job n, for all servers k (l constraints):

$makespan \geq start_{nk} + runtime_{ik}$

The objective here is to minimize makespan, which should minimize the total runtime of the entire plan of scheduled and new jobs in the whole cluster. Once a solution is found, the jobs are scheduled according to the $schedule_{ik}$ variables, and the next layer of new jobs is scheduled in the same fashion, until all new jobs are scheduled.

It is again noted that scheduling a large number of jobs using linear programming requires a lot of variables, particularly if those jobs depend on one another as in, for example, a parent-child relationship where the child consumes the data produced by a set of immediate parents. As such, another model herein involves scheduling the jobs "layer by layer", including recursively scheduling new jobs that do not depend on any other new unscheduled jobs. In this model, an unscheduled job must have all the immediate parents already scheduled.

Some assumptions in this example include:
1. All unscheduled jobs have all parents already scheduled in the current state of the server.
2. The current state includes the scheduled and running jobs, the servers on which they are scheduled, and their anticipated start time (i.e., the order).
3. Each already-schedule job's properties are described in the current state, where their start and end times are known. Accordingly, the end time ed for each intermediate data file is known given the current state. Note, base data files have $e_d$ set to 0.
4. All scheduled jobs have a start time in the current state (i.e., scheduled job starts and job ends are known).

The relevant notations, constants used to define the constraints and the objective function, and variables used to define the constraints and the objective function are listed in the following tables. The scheduling algorithm finds a solution to a scheduling problem by finding an assignment to these variables.

TABLE 1

| | Notation | |
|---|---|---|
| uJ | $uJ \subseteq J$ | The set of unscheduled jobs to be scheduled by the current, one invocation of a scheduling algorithm |
| sJ | $sJ \subseteq J$ | The set of already scheduled jobs which are described in the current state. |
| $IN_i$ | $IN_i \subseteq D \cup I$ | The set of data files input to the job $J_i$ |
| $sJ_k$ | $sJ_k = \{J_i \in sJ, J_i \text{ scheduled at } S_k\}$ | The set of already scheduled jobs on server $S_k$. These sets are part of current state description. |

TABLE 2

| | | Constants | | |
|---|---|---|---|---|
| Constants | Defined for | How many | Formula | Definition |
| $p_i$ | $\forall i, J_i \in uJ$ | $|uJ|$ | | The runtime of job $J_i$ |
| $e_d$ | $\forall d, T_d \in I$ | $|I|$ | | The end time when input data $T_d$ is produced in the current state. Base data has the end time set to 0. |
| $r_i$ | $\forall i, J_i \in uJ$ | $|uJ|$ | $\max_{T_d \in IN_i} e_d$ | The earliest release date of job $J_i$ (i.e. the time when the last input file is produced) |
| $l_d$ | $\forall d, T_d \in D \cup I$ | $|D \cup I|$ | | The time it takes to load data file $T_d$ onto another server MMFS from a server's MMFS or, for base data, from HDFS |
| $f_k$ | $\forall k, S_k \in S$ | $|S|$ | $\max_{J_i \in sJ_k}(start(J_i) + r_i)$ | The finish time of server $S_k$, given the already scheduled jobs, before scheduling new jobs on $S_k$. |

TABLE 3

Variables

| Variables | Domain | Defined for | How many | Definition |
|---|---|---|---|---|
| schedule$_{i,k}$ | $\in \{0, 1\}$ | $\forall i, k, J_i \in uJ, S_k \in S$ | $|uJ| \times |S|$ | A boolean variable representing the unscheduled job $J_i$ being placed on server $S_k$ |
| load$_{d,k}$ | $\in \{0, 1\}$ | $\forall d, T_d \in \cup_{J_i \in uJ} IN_i$ | $|\cup_{J_i \in uJ} IN_i|$ | A boolean variable representing the fact that data $T_d$ needs to be loaded onto server $S_k$ because it is needed there by at least a new unscheduled job, and it is not already loaded there; load$_{d,k}$ = 1 iff $\exists J_i \in$ uJ such that $T_d \in IN_i$ and scheduled$_{i,k}$ = 1 |
| start$_k$ | start$_k \geq f_k$ | $\forall k, S_k \in S$ | $|S|$ | For a specific job schedule, the earliest time at which new jobs can start to be scheduled on server $S_k$. It is defined as the maximum among $f_k$ and the earliest (minimum) among the start time of jobs in uJ scheduled on $S_k$. |
| makespan | | | 1 | The maximum total runtime. It is defined as maximum of runtime across all servers. This is the objective function to be minimized. |

Constraints regarding the present scheduling algorithm include:
1. If job $J_i$ consumes file $T_d$ and file $T_d$ is not already on server $S_k$, an applicable constraint is: load$_{d,k}$ is 1 if at least one job in uJ, that has as input $T_d$, is also scheduled on $S_k$.
There are $|\cup_{J_i \in uJ} IN_i| \times |S|$ such constraints.
This constraint comes from the logical definition:
load$_{d,k}$=max$_{J_i \in uJ, T_d \in IN_i}$schedule$_{i,k}$
Implementation in logical programming (LP):
$|\{J_i | J_i \in uJ, T_d \in IN_i\}| \times $load$_{d,k} \geq \Sigma_{J_i \in uJ, T_d \in IN_i}$schedule$_{i,k}$
2. In some embodiments, server $S_k$ cannot start processing new jobs until all of its previous jobs are complete and until all input files consumed by it are produced. This however is a pessimistic assumption since not every new job on server $S_k$ should have to wait for every input file.
There are $|S|$ such constraints.
This constraint is comes from the logical definition:
start$_k$=max($f_k$,max$_{T_d \in \cup_{J_i \in uJ} IN_i, load_{d,k}=1}e_d$)
Implementation in LP:
start$_k \geq f_k$
start$_k \geq$load$_{d,k} \times e_d$
3. Each job $J_i$ must be placed on exactly one server:
There are $|uJ|$ such constraints.
Implementation in LP:

$$\sum_{S_k \in S} \text{schedule}_{i,k} = 1$$

4. Here too the makespan is the minimum of the maximum server finish times. Accordingly, for each server $S_k$ the makespan is the objective function to be minimized.

There are $|S|$ such constraints.
Implementation in LP:

$$\text{start}_k + \sum_{J_i \in uJ} (p_i \times \text{schedule}_{i,k}) + \sum_{T_d \in \cup J_i \in uJ IN_i} (l_d \times \text{load}_{d,k}) \leq \text{makespan}$$

All systems and processes discussed herein may be embodied in program code stored on one or more tangible, non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

FIG. 5 is an illustrative depiction of a system, apparatus, or device that may be used to, for example, implement one or more of the logical descriptions of abstractions of FIG. 2. FIG. 5 is a block diagram of a computing device or machine, in accordance with some embodiments. System 500 may be, for example, associated with devices for implementing the processes disclosed herein, including the disclosed algorithm selection and job scheduling processes. System 500 comprises a processor 505, such as one or more commercially available Central Processing Units (CPUs) in the form of one-chip microprocessors or a multi-core processor, coupled to a communication device 520 configured to communicate via a communication network (not shown in FIG. 5) to another device or system (e.g., an administrator device or another "worker" device, not shown). System 500 may also include a cache 510, such as RAM memory modules. The system may further include an input device 515 (e.g., a touchscreen, mouse and/or keyboard to enter content) and an output device 525 (e.g., a touchscreen, a computer monitor to display, a LCD display). In some embodiments, system

500 may perform at least some of the functions associated with one or more of the logical descriptions and abstractions of FIG. 2.

Processor 505 communicates with a storage device 530. Storage device 530 may comprise any appropriate information storage device, including combinations of magnetic storage devices (e.g., a hard disk drive), optical storage devices, solid state drives, and/or semiconductor memory devices. In some embodiments, storage device 530 may comprise a database system, including in some configurations an in-memory database.

Storage device 530 may store program code or instructions to control an operation of a computing device (e.g., system 500) to perform scheduling functions, in accordance with processes herein. Processor 505 may perform the instructions for implementing, for example, process 1500 in accordance with any of the embodiments described herein. Program instructions for selecting and using scheduling algorithms 535 may furthermore include other program elements, such as an operating system, a database reporting system, and/or device drivers used by the processor 505 to interface with, for example, a controller or manager, a worker device, and distributed file storage systems (not shown in FIG. 5). Storage device 530 may also include data used by system 500, in some aspects, in performing one or more of the processes herein, including individual processes, individual operations of those processes, and combinations of the individual processes and the individual process operations.

Although embodiments have been described with respect to certain contexts, some embodiments may be associated with other types of devices, systems, and configurations, either in part or whole, without any loss of generality.

The embodiments described herein are solely for the purpose of illustration. Those in the art will recognize other embodiments which may be practiced with modifications and alterations.

What is claimed is:

1. A system comprising:
    a cluster of a plurality of machines logically grouped together, each of the plurality of machines having a processor and a main memory component;
    a distributed memory layer, the distributed memory layer comprising the main memory components of the plurality of machines in the cluster being connected to each other through a network layer and configured to transmit and receive data directly to and from each other, wherein the distributed memory layer comprising the main memory of the plurality of machines logically operates as a common memory layer for the plurality of machines and the plurality of machines use both the common memory layer and the shared distributed storage facility to execute the query execution plan;
    a shared distributed storage facility storing a set of data and accessible by the plurality of machines over a communication network;
    a controller to dynamically select, in response to a current state of the query execution plan comprising a plurality of executable jobs for the set of data and a current state and workload characteristics of the plurality of machines in the cluster, which one of a set of scheduling algorithms to execute, the set of scheduling algorithms each having a different predetermined objective;
    an execution engine to execute the dynamically selected dynamic task scheduling algorithm to determine, for each job in the plurality of jobs comprising the query execution plan, which machine in the cluster to schedule for execution of the job and data placement in the main memory component of the plurality of machines of the distributed memory layer and the shared distributed storage facility for the set of data to execute the respective job wherein the query execution plan is represented by directed acyclic graph defining dependencies between the plurality of jobs of the query execution plan; and
    providing an indication of the determined scheduling of the machines for the execution each of the plurality of jobs.

2. The system of claim 1, wherein each of the plurality of machines can communicate directly with each of the other plurality of machines over the communication network.

3. The system of claim 1, wherein the objective of the set of scheduling algorithms is selected from the group including: minimizing a total runtime to execute the query execution plan, minimizing a total data communication cost to execute the query execution plan, and minimizing a finish time of a last server to execute the query execution plan.

4. The system of claim 3, wherein a scheduling algorithm having the predetermined objective of minimizing a finish time of a last server to execute the query execution plan (i) considers inter-job dependencies between the plurality of jobs of the query execution plan, and (ii) arbitrarily orders new jobs or orders new jobs further based on an earliest release date and a latest critical time.

5. The system of claim 3, wherein a scheduling algorithm having the predetermined objective of minimizing a finish time of a last server to execute the query execution plan recursively schedules subsets of new jobs, jobs in each subset having an absence of dependencies therebetween.

6. The system of claim 5, wherein each job has a determinable unique release date and the scheduling algorithm further orders new jobs to be scheduled in an ascending order based on the release date of the new jobs.

7. The system of claim 5, wherein each job has a determinable start time and end time and the scheduling algorithm further orders a new job only when all immediate parent jobs for the new job have been scheduled.

8. A method comprising:
    storing a set of data in a shared distributed storage facility, the stored data being accessible by a cluster of a plurality of machines logically grouped together, over a communication network, each of the plurality of machines having a processor and a main memory component, the main memory components of the plurality of machines in the cluster being connected to each other through a network layer to comprise a distributed memory layer and are configured to transmit and receive data directly to and from each other, wherein the distributed memory layer comprising the main memory of the plurality of machines logically operates as a common memory layer for the plurality of machines and the plurality of machines use both the common memory layer and the shared distributed storage facility to execute the query execution plan;
    dynamically selecting by a controller, in response to a state of the current query execution plan comprising a plurality of executable jobs for the set of data and a current state and workload characteristics of the plurality of machines in the cluster, which one of a set of scheduling algorithms to execute, the set of scheduling algorithms each having a different predetermined objective;

executing by an execution engine the dynamically selected dynamic task scheduling algorithm to determine, for each job in plurality of jobs comprising the query execution plan, which machine in the cluster to schedule and data placement in the main memory component of the plurality of machines of the distributed memory layer and the shared distributed storage facility for the set of data to execute the respective job, wherein the query execution plan is represented by directed acyclic graph defining dependencies between the plurality of jobs of the query execution plan; and providing an indication of the determined scheduling of the machines for the execution each of the plurality of jobs.

9. The method of claim 8, further comprising each of the plurality of machines having the functionality to communicate directly with each of the other plurality of machines over the communication network.

10. The method of claim 8, wherein the objective of the set of scheduling algorithms is selected from the group including: minimizing a total runtime to execute the query execution plan, minimizing a total data communication cost to execute the query execution plan, and minimizing a finish time of a last server to execute the query execution plan.

11. The method of claim 10, wherein a scheduling algorithm having the predetermined objective of minimizing a finish time of a last server to execute the query execution plan (i) considers inter-job dependencies between the plurality of jobs of the query execution plan, and (ii) arbitrarily orders new jobs or orders new jobs further based on an earliest release date and a latest critical time.

12. The method of claim 10, wherein a scheduling algorithm having the predetermined objective of minimizing a finish time of a last server to execute the query execution plan recursively schedules subsets of new jobs, jobs in each subset having an absence of dependencies therebetween.

13. The method of claim 12, wherein each job has a determinable unique release date and the scheduling algorithm further orders new jobs to be scheduled in an ascending order based on the release date of the new jobs.

14. The method of claim 12, wherein each job has a determinable start time and end time and the scheduling algorithm further orders a new job only when all immediate parent jobs for the new job have been scheduled.

* * * * *